(12) United States Patent
Cornog et al.

(10) Patent No.: US 6,570,624 B2
(45) Date of Patent: May 27, 2003

(54) INTERPOLATION OF A SEQUENCE OF IMAGES USING MOTION ANALYSIS

(75) Inventors: Katherine H. Cornog, Newburyport, MA (US); Garth A. Dickie, Framingham, MA (US); Peter J. Fasciano, Natick, MA (US); Randy M. Fayan, Medford, MA (US); Robert A. Gonsalves, Wellesley, MA (US); Michael Laird, Nashua, NH (US)

(73) Assignee: Avid Technology, Inc., Tewksbury, MA (US)

( * ) Notice: Subject to any disclaimer, the term of this patent is extended or adjusted under 35 U.S.C. 154(b) by 258 days.

(21) Appl. No.: 09/839,160

(22) Filed: Apr. 20, 2001

(65) Prior Publication Data

US 2003/0035592 A1 Feb. 20, 2003

Related U.S. Application Data

(63) Continuation of application No. 09/657,699, filed on Sep. 8, 2000.

(51) Int. Cl.⁷ ................................................. H04N 7/01
(52) U.S. Cl. ...................................... 348/446; 382/276
(58) Field of Search ................................. 348/448, 451, 348/452, 446; 382/300, 236, 276

(56) References Cited

U.S. PATENT DOCUMENTS 4,924,310 A    5/1990   von Brandt (List continued on next page.)

OTHER PUBLICATIONS

Agrawala, Maneesh, et al., "Model–Based Motion Estimation for Synthetic Animations", ACM Multimedia 95 Electronic Proceedings, Nov. 5–9, 1995, pp. 1–25.

(List continued on next page.)

Primary Examiner—Von J. Couso
(74) Attorney, Agent, or Firm—Peter J. Gordon

(57) ABSTRACT

Two images are analyzed to compute a set of motion vectors that describes motion between the first and second images. A motion vector is computed for each pixel in an image at a time between the first and second images. This set of motion vectors may be defined at any time between the first and second images, such as the midpoint. The motion vectors may be computed using any of several techniques. An example technique is based on the constant brightness constraint, also referred to as optical flow. Each vector is specified at a pixel center in an image defined at the time between the first and second images. The vectors may point to points in the first and second images that are not on pixel centers. The motion vectors are used to warp the first and second images to a point in time of an output image between the first and second images using a factor that represents the time between the first and second image at which the output image occurs. The warped images are then blended using this factor to obtain the output image at the desired point in time between the first and second images. The point in time at which the output image occurs may be different from the time at which the motion vectors are determined. The same motion vectors may be used to determine two or more output images at different times between the first and second images. The images may be warped using a technique in which many small triangles are defined in an image corresponding in time to the point in time between the first and second images at which the motion vectors are determined. A transform for each small triangle from the point in time at which the motion vectors are determined to the desired interpolated image time is determined, e.g., the triangle is warped using the motion vectors associated with its vertices. For each pixel in each triangle in the output image, corresponding points in the first and second images are determined, and the first and second images are spatially sampled at these points. These samples for each pixel are combined to produce a value for that pixel in the output image. A motion vector map also may be generated between two fields of opposite field sense. An offset introduced by such calculation may be removed. During warping or other operation using the adjusted vector map, when sampling a field of one field sense to generate a field of an opposite field sense, that offset is reintroduced by translating the sampling region.

13 Claims, 13 Drawing Sheets

U.S. PATENT DOCUMENTS

| | | | |
|---|---|---|---|
| 5,182,633 | A | | 1/1993 | Antonio et al. |
| 5,353,119 | A | | 10/1994 | Dorricott et al. |
| 5,369,443 | A | | 11/1994 | Woodham |
| 5,410,358 | A | | 4/1995 | Shackleton et al. |
| 5,438,423 | A | | 8/1995 | Lynch et al. |
| 5,469,226 | A | | 11/1995 | David et al. |
| 5,568,200 | A | * | 10/1996 | Pearlstein et al. .......... 348/426 |
| 5,579,054 | A | | 11/1996 | Sezan et al. |
| 5,594,676 | A | | 1/1997 | Greggain et al. |
| 5,608,464 | A | | 3/1997 | Woodham |
| 5,642,170 | A | | 6/1997 | Hackett et al. |
| 5,654,771 | A | | 8/1997 | Tekalp et al. |
| 5,657,402 | A | | 8/1997 | Bender et al. |
| 5,668,914 | A | | 9/1997 | Inuiya et al. |
| 5,673,207 | A | | 9/1997 | Nomura |
| 5,727,080 | A | | 3/1998 | Cox et al. |
| 5,748,761 | A | | 5/1998 | Chang et al. |
| 5,850,229 | A | | 12/1998 | Edelsbrunner et al. |
| 5,880,788 | A | | 3/1999 | Bregler |
| 5,920,657 | A | | 7/1999 | Bender et al. |
| 5,929,919 | A | | 7/1999 | De Haan et al. |
| 5,940,145 | A | | 8/1999 | Burl |
| 5,973,733 | A | | 10/1999 | Gove |
| 5,982,389 | A | | 11/1999 | Guenter et al. |
| 5,982,440 | A | | 11/1999 | Aoki |
| 5,991,459 | A | | 11/1999 | Fogel |
| 6,005,626 | A | | 12/1999 | Ding |
| 6,016,152 | A | | 1/2000 | Dickie ......................... 345/436 |
| 6,075,818 | A | | 6/2000 | Thomson |
| 6,081,606 | A | | 6/2000 | Hansen et al. |
| 6,088,393 | A | | 7/2000 | Knee et al. |
| 6,160,586 | A | * | 12/2000 | Justiss et al. ................ 348/452 |

OTHER PUBLICATIONS

Barron., J.L. et al., "Performance of Optical Flow Techniques", IJCV 12:1, 1994, pp. 1–60.

Beauchemin, S.S., et al., "The Computation of Optical Flow", ACM Computing Surveys, vol. 27, No. 3, Sep., 1995, pp. 433–467.

Bergen, James R., et al., "Hierarchical Model–Based Motion Estimation", Proc. Euro. Conf. on Comp. Vision, Springer–Verlag, 1992, pp. 237–252.

Bergen, J.R., et al., "Hierarchical Motion–Based Frame Rate Conversion", David Sarnoff Research Center, Princeton, NJ, Apr. 1990, pp. 1–15.

Buxton, B.F., et al., "Computation of optic flow from the motion of edge features in image sequences", Image and Vision Computing, vol. 2, No. 2, May 1984, pp. 59–75.

Chen, Shenchange Eric., et al., "View Interpolation for Image Synthesis", Proc. SIGGRAPH 1993, pp. 279–288.

Ezzat, Tony et al., "Visual Speech Synthesis by Morphing Visemes", Massachusetts Institute of Technology, A.I. Memo No. 1658, CBCL Paper No. 173, May 1999, pp. 1–12.

Flomo Data Sheet, Time–warping software, Aug. 2000, 2 pages.

Gomes et al., "Time Warping of Audio Signals", in Proc. Comp.Graph.International (CGI 99), Jul. 1999, pp. 52–57.

Liu, Hongehe, et al., "Accuracy vs. Efficiency Trade–offs in Optical Flow Algorithms", Proc. 4th Eur.Conf. on Comp.Vision, Apr. 1996, vol. II, pp. 174–183.

Louchet, Jean, et al., "Building new tools for Synthetic Image Animation by using Evolutionary Techniques", Artificial Evolution '95, Proc. of the EA95 Workshop in Brest, France, Sep. 1995.

Lucas, Bruce, et al., "An Iterative image Registration Technique with an Application to Stereo Vision", Proc. 7th Int'l.Jt.Conf. on AI, 1981, pp. 674–679.

Teodosio, Laura, et al., "Salient Video Stills: Content and Context Preserved", Proc. 1st Int'l.Conf. on Multimedia, Aug. 1993, pp. 39–46.

Schodl, Arno, et al., "Video Textures", Proc. SIGGRAPH 2000, 2000, pp. 489–498.

* cited by examiner $R_{TR}, T_R = 1.25$ $A, T_A = 1.0$ $B, T_B = 2.0$ $V, T_{AB} = 1.5$ $R_{TR}, T_R = 1.25$

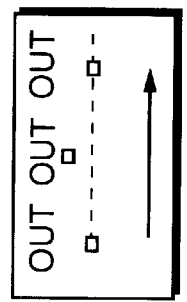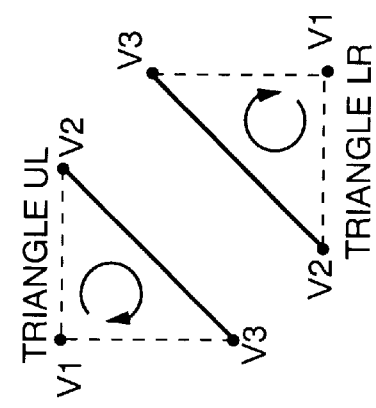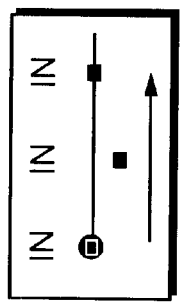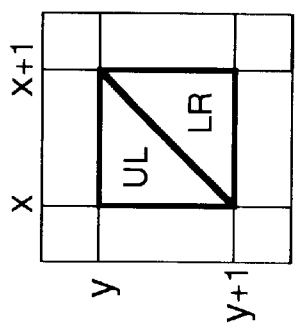
FIG. 3G
FIG. 3F

INTERPOLATION OF A SEQUENCE OF IMAGES USING MOTION ANALYSIS

CROSS REFERENCE TO RELATED APPLICATION

This application claims the benefit under 35 U.S.C. 120 and is a continuing application of U.S. patent application Ser. No. 09/657,699, filed Sep. 8, 2000, now pending, which is hereby incorporated by reference. This application also is related to U.S. patent application entitled "Analyzing Motion of Characteristics in Images," by Katherine Cornog and Randy Fayan, filed on even date herewith, and "Correcting Motion Vector Maps for Image Processing," by Katherine Cornog and Randy Fayan, filed on even date herewith, both of which are hereby incorporated by reference.

BACKGROUND

For applications such as standards conversion and generation of slow and fast motion in film, television and other video productions, images in a sequence of images may be simply repeated or dropped to achieve a desired sampling rate. Such a technique, however, generally produces unwanted visible artifacts such as jerky motion. Analysis of motion in a sequence of images is commonly used to improve interpolation of the sequence of images.

Motion analysis generally is performed by determining a set of motion parameters that describe motion of pixels between a first image and a second image. For example, the motion parameters may describe forward motion of pixels from the first image to the second image, and/or backward motion of pixels from the second image to the first image. The motion parameters may be defined at a time associated with either or both of the first and second images or at a time between the first and second images. These motion parameters are then used to warp the first and second images to obtain an interpolated image between the first and second images. This process generally is called motion compensated interpolation.

SUMMARY

Two images are analyzed to compute a set of motion vectors that describes motion between the first and second images. A motion vector is computed for each pixel in an image at a time between the first and second images. This set of motion vectors may be defined at any time between the first and second images, such as the midpoint. The motion vectors may be computed using any of several techniques. An example technique is based on the constant brightness constraint, also referred to as optical flow. Each vector is specified at a pixel center in an image defined at the time between the first and second images. The vectors may point to points in the first and second images that are not on pixel centers.

The motion vectors are used to warp the first and second images to a point in time of an output image between the first and second images using a factor that represents the time between the first and second image at which the output image occurs. The warped images are then blended using this factor to obtain the output image at the desired point in time between the first and second images. The point in time at which the output image occurs may be different from the time at which the motion vectors are determined. The same motion vectors may be used to determine two or more output images at different times between the first and second images.

The images may be warped using a technique in which many small triangles are defined in an image corresponding in time to the point in time between the first and second images at which the motion vectors are determined. A transform for each small triangle from the point in time at which the motion vectors are determined to the desired interpolated image time is determined, e.g., the triangle is warped using the motion vectors associated with its vertices. For each pixel in each triangle in the output image, corresponding points in the first and second images are determined, and the first and second images are spatially sampled at these points. These samples for each pixel are combined to produce a value for that pixel in the output image.

Motion compensated interpolation also may be performed on two or more images that are dissimilar, or that are non-sequential, or that are not contiguous in any one sequence of images. Thus, motion analysis may be used to process transitions between different sequences of images, such as a dissolve or a jump cut. If two consecutive sequences of images have corresponding audio tracks, the audio tracks may be processed to identify a point in time at which motion compensated interpolation of the transition between the sequences should be performed.

Motion compensated interpolation of a sequence of images also may be performed in conjunction with audio processing. For example, if interpolation of the sequence of images changes the duration of the sequence, the duration of a corresponding audio track may be changed to retain synchronization between the audio and the sequence of images. Resampling of the audio may be used to change the duration of the audio, but results in a change in pitch. Time scaling of the audio also may be used to change the duration of the audio without changing the pitch.

Occasionally, such interpolation creates visible artifacts in the resulting output images, particularly if there is a foreground object that occludes then reveals a background object, or if there is an object that appears or disappears in the images. In some cases, the foreground may appear to stretch or distort, or the background may appear to stretch or distort, or both. In such cases, a region in an image may be defined. The region may be segmented into foreground and background regions. A tracker then may be used to track either the foreground region or the background region or both as an object. A single motion vector or a parameterized motion model obtained from the tracker may be assigned to the tracked region. A combination map also may be defined to control which pixels of the input images are used to contribute to each pixel of an output image based on how a motion vector transforms a pixel from the input image to the output image.

For interlaced media, a vector map of motion also can be computed between fields of opposite sense, i.e., odd and even fields, by treating the two fields as if they are two images of the same type. The resulting vector map, when generated using two fields of opposite field sense, has a vertical offset of about one half of a line. This vector map is then modified by adjusting the vertical component of all of the vectors either up or down half a line. Warping operations then are performed using the modified vector map. However, when sampling a field of one field sense to generate a field of an opposite field sense, the sampling region is translated either up or down half a line.

Accordingly, in one aspect, an output image associated with a point in time between a first image and a second image is generated by determining a motion vector for each pixel in an image at a map time between the first image and the second image, wherein the map time is different from the point in time of the output image. Each motion vector describes motion of a pixel of the image at the map time to a first point in the first image and a second point in the second image. A factor that represents the point in time between the first image and the second image at which the output image occurs is calculated. The first image is warped according to the determined motion vectors and the factor. The second image is warped according to the determined motion vectors and the factor. The warped first image and the warped second image are blended according to the factor to obtain the output image.

In another aspect, a plurality of output images, wherein each output image is associated with a different point in time between a first image and a second image, is generated by determining a motion vector for each pixel in an image at a map time between the first image and the second image. Each motion vector describes motion of a pixel of the image at the map time to a first point in the first image and a second point in the second image. For each output image, a factor that represents the point in time between the first image and the second image at which the output image occurs is calculated. For each output image, the first image is warped according to the determined motion vectors and the factor for the output image. For each output image, the second image is warped according to the determined motion vectors and the factor for the output image. For each output image, the warped first image and the warped second image are blended according to the factor for the output image.

In one embodiment, the first image is in a first sequence of images and the second image is in a second sequence of images such that the first image is not contiguous with the second image in a sequence of images. In another embodiment, the first sequence has associated audio and the second sequence has associated audio, the audio associated with the first sequence is dissolved to the audio associated with the second sequence. In another embodiment, a combination of the output image and the first and second images provides an output sequence of images with a duration at playback different from a duration of an input sequence of images containing the first and second images at playback. If the input sequence of images has associated audio with a duration, the duration of the audio may be adjusted to match the duration of the output sequence of images.

In one embodiment, the first and second images are processed to remove invalid image data. In another embodiment, during warping of an image, any motion vector that transforms a point in the output image to an area outside of one of the first and second images results in no contribution from that input image to the output image. In another embodiment, the output image is initialized to a blend of the first and second images according to the determined factor.

In another aspect, a plurality of output images, wherein each output image is associated with a different point in time between a first image of a first sequence of one or more images and a second image of a second sequence of one or more images, is generated. For each output image, a pair of a first image from the first sequence and a second image from the second sequence is selected. For each selected pair of first and second images, a motion vector is determined for each pixel in an image at a map time between the first image and the second image, wherein the motion vector describes motion of a pixel of the image at the map time to a first point in the first image and a second point in the second image. For each output image, a factor that represents the point in time, between the first and second images selected for the output image, at which the output image, is calculated. For each output image, the first image selected for the output image is warped according to the factor for the output image and the motion vectors determined for the first and second images selected for the output image. For each output image, the second image selected for the output image is warped according to the factor for the output image and the motion vectors determined for the first and second images selected for the output image. For each output image, the warped first image and the warped second image are blended according to the factor for the output image.

In another aspect, a transition of a plurality of output images is generated from a first sequence of images to a second sequence of images wherein an image at an end of the first sequence is not contiguous with an image at a beginning of the second sequence. For each output image, a pair of a first image from the first sequence and a second image from the second sequence is selected such that the output image has a point in time between the first image and the second image in the transition. For each selected pair of first and second images, a set of motion vectors is determined that describes motion between the first image and the second image. For each output image, a factor is calculated that represents the point in time, between the first and second images selected for the output image, at which the output image occurs. For each output image, motion compensated interpolation is performed to generate the output image according to the determined set of motion vectors and the calculated factor.

In another aspect, a jump cut is processed from a first image at an end of a first segment of sequence of images and corresponding audio and a second image at a beginning of a second segment in the sequence of images and corresponding audio. The corresponding audio is processed to identify an audio break between the audio corresponding to the first segment and the audio corresponding to the second segment. A set of motion vectors is determined that describes motion between the first image and the second image. Motion compensated interpolation is performed to generate one or more images between the first image and the second image according to the determined set of motion vectors at a point in time corresponding to the audio break.

In another aspect, a first image and a second image are warped and blended to obtain an output image at an output time between the first image and the second image. A set of motion vectors is determined at a map time and that describes motion between the first image and the second image. A primary transform is determined for each triangle in a set of triangles, defined in an image at the map time, from the map time to the output time using the determined set of motion vectors. For each triangle, any pixels in the output image that are contained within the triangle using the primary transform are identified. A first transform is determined for each triangle in the set of triangles from the output time to a time of the first image. For each pixel in each triangle at the output time, a point in the first image is identified using the first transform and the first image is spatially sampled at the point. A second transform is determined for each triangle in the set of triangles from the output time to a time of the second image. For each pixel in each triangle at the output time, a point in the second image is identified using the second transform and the second image is spatially sampled at the point. For each pixel in each triangle at the output time, the spatially sampled first image and the spatially sampled second image are combined to obtain a value for the pixel in the output image.

In another aspect, a first image and a second image are warped to obtain an output image at an output time between the first image and the second image. A set of motion vectors is determined at a map time and that describes motion between the first image and the second image. A primary transform is determined for each triangle in a set of triangles, defined in an image at the map time, from the map time to the output time using the determined motion vectors. For each triangle, any pixels in the output image that are contained within the triangle at the output time are identified using the primary transform. For each pixel in each triangle at the output time, the first image and the second image are spatially sampled at points corresponding to the pixel. The spatially sampled first image and the spatially sampled second image are combined to obtain a value for the pixel in the output image.

In one embodiment, the map time is between the first image and the second image. In another embodiment, the map time is different from the output time.

In another aspect, duration of an input sequence of images with associated audio may be changed, wherein the input sequence of images and associated audio has a duration. An indication of a selection of an operation by an operator, indicative of a desired duration of an output sequence of images, is received. In response to the received indication, a first image and a second image in the sequence of images are selected. A set of motion vectors is determined that describes motion between the first image and the second image. Motion compensated interpolation is performed to generate one or more images between the first image and the second image according to the determined motion vectors. These operations are performed for multiple pairs of first and second images in the sequence of images to provide the output sequence of images. The duration of the associated audio is adjusted to retain synchronization with the output sequence of images. In one embodiment, the output sequence of images may be played back with the audio. In another embodiment, adjusting the duration of the audio involves resampling of the audio. In another embodiment, adjusting the duration of the audio involves time scaling of the audio.

In another aspect, color correction may be performed by generating a first color histogram from first image from a first sequence of images and generating a second color histogram from a second image from a second sequence of images. A set of motion vectors is determined from the first and second color histograms, that describes motion between the first color histogram and the second color histogram. A table of color correction values is generated from the set of motion vectors. The table of color correction values is applied to a sequence of images.

In another aspect, artifacts in an image created using motion compensated interpolation of a first image and a second image may be reduced. A set of motion vectors is determined that describes motion between the first image and the second image. A foreground region and a background region are identified in the first and second images. Tracking is performed on at least one of the foreground region and the background region to determine a motion model for the tracked region. The set of motion vectors corresponding to the tracked region is changed according to the motion model for the tracked region. Motion compensated interpolation is performed to generate one or more images between the first image and the second image according to the changed set of motion vectors. In one embodiment, a combination map is determined using the changed set of motion vectors to indicate which of the first and second images are used to contribute to a pixel in an output image.

In another aspect, two fields of interlaced video may be processed by computing motion vectors describing motion of image characteristics from a field of a frame to another field of opposite field sense. An offset corresponding to one half of a line (having a sign according to an orientation of the y-axis of the image space and which field has the top line of the image) is removed from the motion vectors. The motion vectors then are used to generate a sampling region at a desired output time. The sampling region is transformed using the motion vectors to a sample time at one of the fields. The sampling region also is transformed using the motion vectors to a sample time at the other of the fields. The field sense of an output field to be generated at the desired output time is determined. The transformed sampling region for the field with a field sense opposite the field sense of the output field is translated by an offset of one half of a line and having a sign determined by the orientation of the y-axis of the image space and which field has the top line of the image. The output field is generated using the transformed and translated sampling regions and the fields of the frame. If the desired output time is the time of one of the fields, the generated output field may be combined with the field at the desired output time to generate a progressive image. An effect may be performed on this progressive image. The progressive image with the effect may be vertically decimated (i.e., by sampling every other line) to produce a field at a desired output time.

In another aspect, two fields of interlaced video may be processed by computing motion vectors describing motion of image characteristics from a field of a frame to another field of opposite field sense. An offset corresponding to one half of a line and having a sign according to an orientation of the y-axis of the image space and which field includes the top line. The time of one of the fields is selected as a desired output time. A sampling region specified at the selected time is transformed using the motion vectors to a sample time at the field that is being warped. The transformed sampling region is translated by an offset of one half of a line and having a sign determined by the orientation of the y-axis of the image space and which field includes the top line. The output field is generated at the desired output time using the transformed and translated sampling region and the field that is being warped. The generated output field may be combined with the field at the desired output time to generate a progressive image. An effect may be performed on this progressive image. The progressive image with the effect may be vertically decimated to produce a field at the desired output time.

BRIEF DESCRIPTION OF THE DRAWINGS

FIGS. 3A–3G illustrate an implementation for manipulating a triangular mesh for performing a warping function using the motion vectors;

DETAILED DESCRIPTION

The general problem to solve using motion analysis to generate an image is, given an image A[x, y] at time $T_A$, and image B[x, y] at time $T_B$, calculate a new resultant image R[x, y] sampled at an arbitrary time $T_R$ between $T_A$ and $T_B$. For example, given images A[x, y] at time $T_A$=1, and image B[x, y] at time $T_B$=2 a new image R[x, y] may be calculated that is a temporally "morphed" image at $T_R$=1.25. Using this technique for equally spaced time samples (e.g. 1.0, 1.2, 1.4, 1.8, and 2.0) results in a sequence of images that has smooth slow motion. Images may also be generated at unequally spaced samples to create an effect of accelerating, decelerating, or even reverse motion over time. Any set of one or more points in time for interpolated samples may be used.

Figure 1:
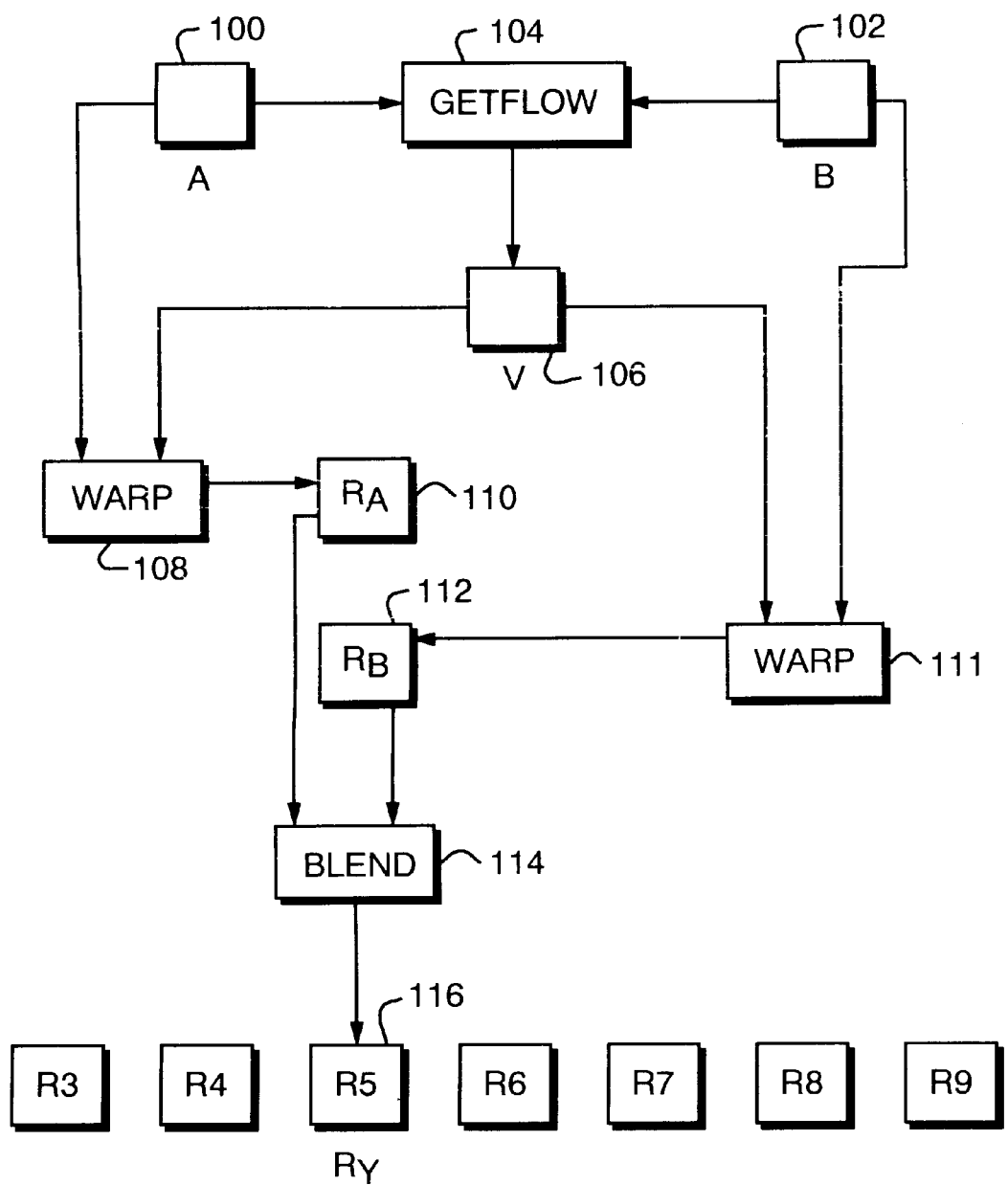
FIG. 1 is a data flow diagram of a process for generating an interpolated image.

Referring now to FIG. 1, a data flow diagram of a process for generating an interpolated image will now be described. Two images 100 and 102 are analyzed by a motion vector generator 104 to produce a set of motion vectors, called a vector map 106, that includes a motion vector for each pixel. Each motion vector describes motion of a pixel of an image located at a time between the first image and the second image to a point in the first image and a point in the second image. This time may be different from the point in time of an output image to be generated. An example implementation of the motion vector generator 104 is described in more detail below in connection to FIG. 2. The motion vectors are determined at a time between the times of the first image and the second image, such as the midpoint. The image 100 and vector map 106 are used by a warp engine 108 to produce a warped version of image 100, as indicated at 110, at a desired point in time between the first image and the second image. Similarly, image 102 and the vector map 106 are used by a warp engine 111 to produce a warped image 112 at a desired point in time between the first image and the second image. An example implementation of a warping engine is described in more detail in connection with FIGS. 3A–3G. The images 110 and 112 are then blended by blender 114, according to the desired point in time between the first image and the second image. The blended image 116 is the desired interpolated image.

The blending function is defined by a blending factor, which represents the point in time between the first image 100 and the second image 102 at which the desired interpolated image is to occur. This blending factor is a value that is greater than or equal to 0, yet less than 1. In performing sample rate conversion, the desired interpolated image may be assigned a point in time, and each existing image may be assigned a point in time. This blending factor (d) may be calculated by quotient of the difference between the time $T_R$ of the interpolated image and the time $T_A$ of the first image, and the difference between the time $T_B$ of the second image and the time $T_A$ of the first image, i.e., d=$(T_R-T_A)/(T_B-T_A)$. When the first image 100 is processed by a warp engine 108, the blending factor (d) is used to scale the motion vectors which in turn are used to warp the image to the desired point.

The second image 102, however, is warped by warp engine 110 using the difference between 1 and the determined blending factor, i.e., (1−d) to scale the motion vectors. In contrast, the blender 114 scales the first warped image 110 by the difference between 1 and the blending factor (1−d). The warped second image 112 is scaled by the blending factor (d).

Figure 2:
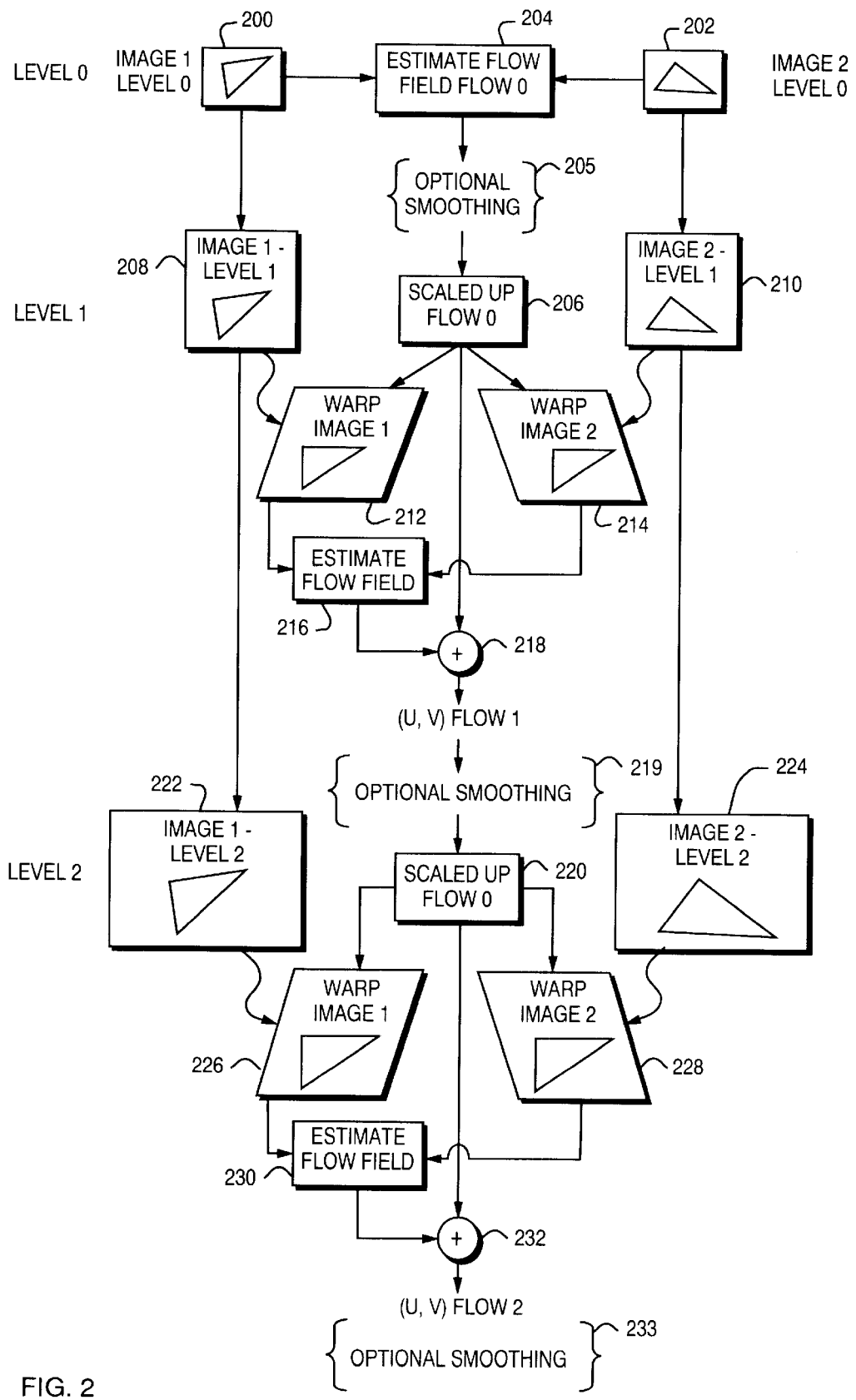
FIG. 2 is a data flow diagram of a process for estimating motion vectors between two images.

Referring now to FIG. 2, an example implementation of motion analysis will now be described. There are many ways in which motion may be estimated between two images. Motion generally may be expressed by a parameterized motion model which may be translational, using two parameters, affine, using six parameters, and projective, using eight parameters. These models are estimated by employing what is known as a constant brightness constraint. Parameters are first estimated on a reduced resolution image, then propagated to a higher resolution version of the image. Details about implementations of such motion analysis may be found in several references, including, but not limited to "Hierarchical Model-Based Motion Estimation," by J. R. Bergen et al., in *Proceedings of Second European Conference on Computer Vision*, pages 237–252, Springer-Verlag, 1992; and "Hierarchical Model-Based Frame Rate Converstion," by J. R. Bergen et al, Technical Report, David Sarnoff Research Center, 1990; and "The Computation of Optical Flow, by S. S. Beauchemin and J. L. Barron, *ACM Computing Surveys*, Vol. 27, No. 3, September 1995, pp. 433–467, which are hereby incorporated by reference.

Motion analysis may be used to estimate a single motion vector for a user-defined region of an image, which is useful for stabilization and tracking applications. Motion analysis also may be used to estimate a translational motion for every pixel in the image by using a small region, e.g., 5 pixels by 5 pixels, centered on each pixel as a region for estimation. This latter approach may be used for re-timing, such as a sample rate conversion, and morphing applications and is referred to as computing the "optical flow" between the images.

In general, the input used to compute optical flow is two images, for example in RGB format. Other color representations also may be used. The images are converted from the existing format to a single component, typically the luminance component of YCrCb. However, other mappings from the color representation to a gray scale may be used. The computation of optical flow is based on an assumption that there is constant luminance from a first image to a second image and this assumption is used to find where each pixel moves. The result is a set of motion vectors, e.g., an array of vertical and horizontal offsets (u and v), with a motion vector for each pixel. The offsets are fractional and thus may be stored in a fixed or floating point format. The vectors are spatially aligned to the centers of pixels in an image that represents a point in time between the input images, such as the midpoint. A vector may describe the motion of a pixel of an image located at a time between the first image and the second image to a point in the first image and a point in the second image.

Most implementations of motion analysis transform a first image to the time point of the second image in order to determine the residual motion error at each level of estimation. Instead of warping one image to another image across one time unit, in this implementation, each of the two images is warped to a center point in time, thus introducing less error and allowing a single set of motion parameters to represent the motion between the first and second images.

As can be seen in FIG. 2, calculation of optical flow thus uses several levels of calculation using images at a different resolution at each level. The number of levels (NumLevels) is related to the maximum amount of motion in an image that can be detected (MaxMotionDetected), in pixels per image. In particular, MaxMotionDetected=$2^{(NumLevels-1)}$.

A suitable default number of levels for computing optical flow of standard definition images (720 by 486 pixels) is six. This number of levels allows for detection of pixel motion of up to 32 pixels. More or fewer levels can be used depending on the spatial resolution of the image and the expected maximum pixel motion.

Referring to FIG. 2, reduced resolution images 200 and 202 are used to estimate a a motion vector for each pixel or region as indicated at 204. The set of vectors so estimated may also be referred to as a "flow field." This estimated flow field is scaled up to a higher spatial resolution, as indicated at 206, and is applied to images 208 and 210 at the higher resolution to obtain warped images 212 and 214. These warped images are used to estimate a flow field at this higher resolution as indicated at 216. The newly estimated flow field is combined with the scaled up flow field 206 as indicated at 218. The flow field at the intermediate resolution is scaled up again to a higher spatial resolution as indicated at 220. Images 222 and 224 at the higher resolution are warped using the scaled up flow field 220 to obtain warped images 226 and 228. A flow field is estimated for the warped images as indicated at 230 and combined with the scaled up flow field 220 as indicated at 232.

At each step of estimating a flow field, namely 204, 218 and 232, smoothing may be applied as indicated at 205, 219, and 233. Smoothing may be performed based on the assumption that a pixel in an image moves in a similar way as any neighboring pixels. A smoothing technique that may be used is described, for example, in "Determining Optical Flow," by B. K. P. Horn and B. G. Schunk, in *Artificial Intelligence*, Vol. 17, Nos. 1–3: pages 185–203, 1981, which is hereby incorporated by reference. Motion fields generally are not smooth at object boundaries. Thus, some smoothing techniques attempt to smooth only within objects and not across strong gradient and motion boundaries. Some examples of such smoothing techniques are found in "An Investigation of Smoothness Constraints for the Estimation of Displacement Vector Fields from Image Sequences," by H. H. Nagel and W. Enkelmann, in *IEEE Transactions on Pattern Analysis and Machine Intelligence*, Vol. 8, No. 5, 1986, which is hereby incorporated by reference.

In areas where the spatial gradient is low it is not always possible to estimate the motion. For example, in the middle of a blank wall there is no local information that indicates if the wall is moving. In this case the motion vectors for pixels that represent the middle of the blank wall are zero. Along strong unidirectional edges it is only possible to estimate the motion vector in the direction perpendicular to the edge, and result in a vector with only one independent component of motion. Areas which have sufficient spatial gradients in two directions contain enough information to compute a reliable motion vector. The zero vectors or the vectors with only one independent component of motion may be updated at a different level in the computation of the optical flow, or they may be modified by a post processing smoothing operation to more accurately reflect the true motion.

Figure 3E:
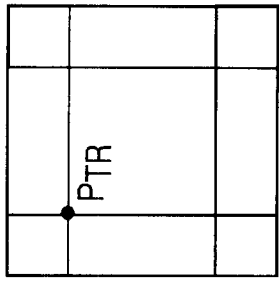
Figure 3C:
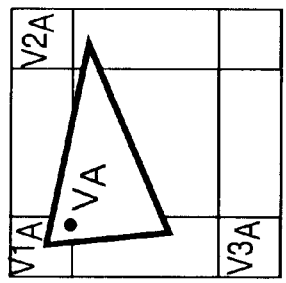
Figure 3D:
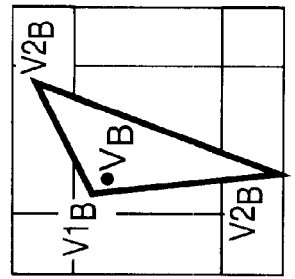
Figure 3A:
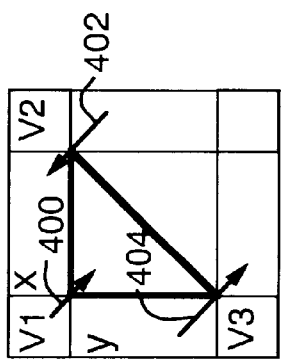
Figure 3B:
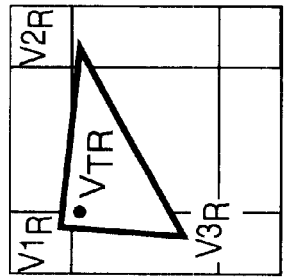

Referring now to FIGS. 3A–3G, an example implementation of warping a first image and a second image to obtain an output image at an output time between the first and second images using a set of motion vectors will now be described. A set of triangles is defined in an image at the point in time that corresponds to the set of motion vectors, thus defining a mesh that covers that image. In this example, each triangle has the area of one half of an image pixel. As shown in FIG. 3A, the vertices of each triangle are three pixels in the image. Vertex V1 has the coordinates x,y. Vertex V2 has the coordinates x+1,y. The vertex V3 has the coordinates x,y+1. The arrows 400, 402 and 404 represent example motion vectors at the three pixel centers. Each triangle is then mapped to the time of the desired interpolated image, as shown in FIG. 3B, by adding the motion vectors of each vertex of the triangle, scaled by the factor d, to the corresponding coordinates of each vertex of each shape. The pixels in the desired interpolated image, i.e., the output image, that are covered by the transformed triangle are then identified. In the example shown in FIG. 3B, one pixel center $V_{TR}$ is covered by the transformed triangle. Similarly, each triangle is mapped to the time of the first image by adding the reverse motion vectors to the original coordinates of each vertex of the triangle, as shown in FIG. 3C. Similarly, each triangle is mapped to the time of the second image by adding the forward motion vectors to the original coordinates for each vertex of each triangle. A transformation matrix from the time of the desired interpolated image to the first image is then estimated for each triangle covering the output image. The matrix is estimated using the two input triangles. Each pixel contained in a triangle in the output image is transformed with the transformation matrix for the triangle to a point in the first image. This point often is not on a pixel center. The first image is then sampled at this point using, for example, an interpolator such as a bilinear, bicubic or sinc filter, to obtain a pixel value contribution from the first image. These steps are then repeated for the second image to obtain a pixel value contribution from the second image. The pixel contributions of the first and second images are blended, using the blending factor defined above, to obtain a value for the pixel in the desired output image, as indicated in FIG. 3E.

It might be observed from FIG. 3A, and as illustrated in FIG. 3F, two triangles are associated with each pixel in the image at the time associated with the motion vectors. Both of these triangles are transformed to the desired interpolated image, and checked to identify the output pixels they cover. One triangle is formed at the upper left corner of a region defined by four pixels. Another triangle is formed in the lower right of the region defined by the four pixels. It is possible for an output pixel center to fall exactly on an edge of a triangle. In order to address this case, a rule may be specified as to which output pixels are defined to be included in which triangles. As an example rule, as shown in FIG. 3G, the upper left triangle may be defined to have two "inclusive" edges, V1, V2 and V1, V3. The lower right triangle may be defined to have one inclusive edge, V2, V3. Points that land to the right of or exactly on inclusive vertices and edges are considered covered by the triangle. Points that land to the left of or exactly on noninclusive vertices and edges are considered not covered by the triangle. For any given line segment, all tests of a point with respect to that line segment should be based on the same numerical calculation. In particular, a point is to the left of a line if it is not to the right of or on the line. Similarly, a point is to the right of a line, but not on it, if it is to the left of but not on the reversed line.

There are several variations, which may be made to the foregoing, including but not limited to the following.

Several modifications may be made to improve processing of interlaced images. First, generating motion vectors between fields of interlaced video exhibits undesirable amounts of motion between the fields. In order to minimize the effects of the inherent field motion, each input field may be scaled up to a full height image before the motion vectors are calculated, by using an interpolator such as bilinear, bicubic, or sinc interpolator. The motion vectors are then created on the scaled up fields, creating a frame-sized vector map. Second, when warping interlaced images using the techniques described above, only those lines that contribute to the final output field are checked for inclusion in a triangle covering a portion of the output image. For instance, if an odd output field is being generated, only pixels on those lines that contribute to the odd field (either all the even lines, or all the odd lines) are checked for inclusion in each triangle.

In another embodiment, motion vectors can be computed between odd and even fields of a frame by treating the two fields as if they are two images of the same type. The resulting vector map, such as vector map 106 in FIG. 1, generated between two fields of opposite types, has a vertical offset of about one half of a line. This vector map is then modified by adjusting the vertical component of all of the vectors either up or down half a line. The warping and combining of the two fields is then performed using the modified vector map to generate an output field. The output field may be either an odd field or an even field. For example, an output field may be an even field generated at the time of the odd field in order to create a progressive image at the time of the odd field. The warping process is generally the same as described above in connection with FIGS. 3A–3G, except that when sampling a field of one field sense to generate a field of an opposite field sense, the offset removed from the vector map is reintroduced by translating the sampling region.

If the first image is an odd field and the second image is an even field, and the desired output image is an even field, then an offset is added to the sampling region that samples the odd field.

If the first image is an odd field and the second image is an even field, and the desired output image is an odd field, then an offset is added to the sampling region that samples the even field.

If the first image is an even field and the second image is an odd field, and the desired output image is an even field, then an offset is added to the sampling region that samples the odd field.

If the first image is an even field and the second image is an odd field, and the desired output image is an odd field, then an offset is added to the sampling region that samples the even field.

In each of these cases, the sampling region may be a triangle defined at the time of the output field that is transformed to the times of the input fields, as described above in connection with FIGS. 3C and 3D. The offset that is added to the sampling region is an offset of either one half line up or down that is added to each vertex of the triangle. The sign of the offset depends on the orientation of the y-axis of the image space and which field has the top line of the image (in NTSC, the even field has the top line of the image), and whether the motion vectors represent motion from the odd field to the even field or from the even field to the odd field. In particular, if the orientation of the y-axis is such that line numbers increase downward in the image, and the even field has the top line, then the offsets are defined by the following table:

| Temporal field order for motion estimation | Vertical offset for vector map | Field Sense of Field to be Generated | Vertical offset to sample region vertices |
|---|---|---|---|
| Odd field to even field | −0.5 | odd | +0.5, when sampling even |
| Odd field to even field | −0.5 | even | −0.5, when sampling odd |
| Even field to odd field | +0.5 | odd | +0.5, when sampling even |
| Even field to odd field | +0.5 | even | −0.5, when sampling odd |

Figure 10:
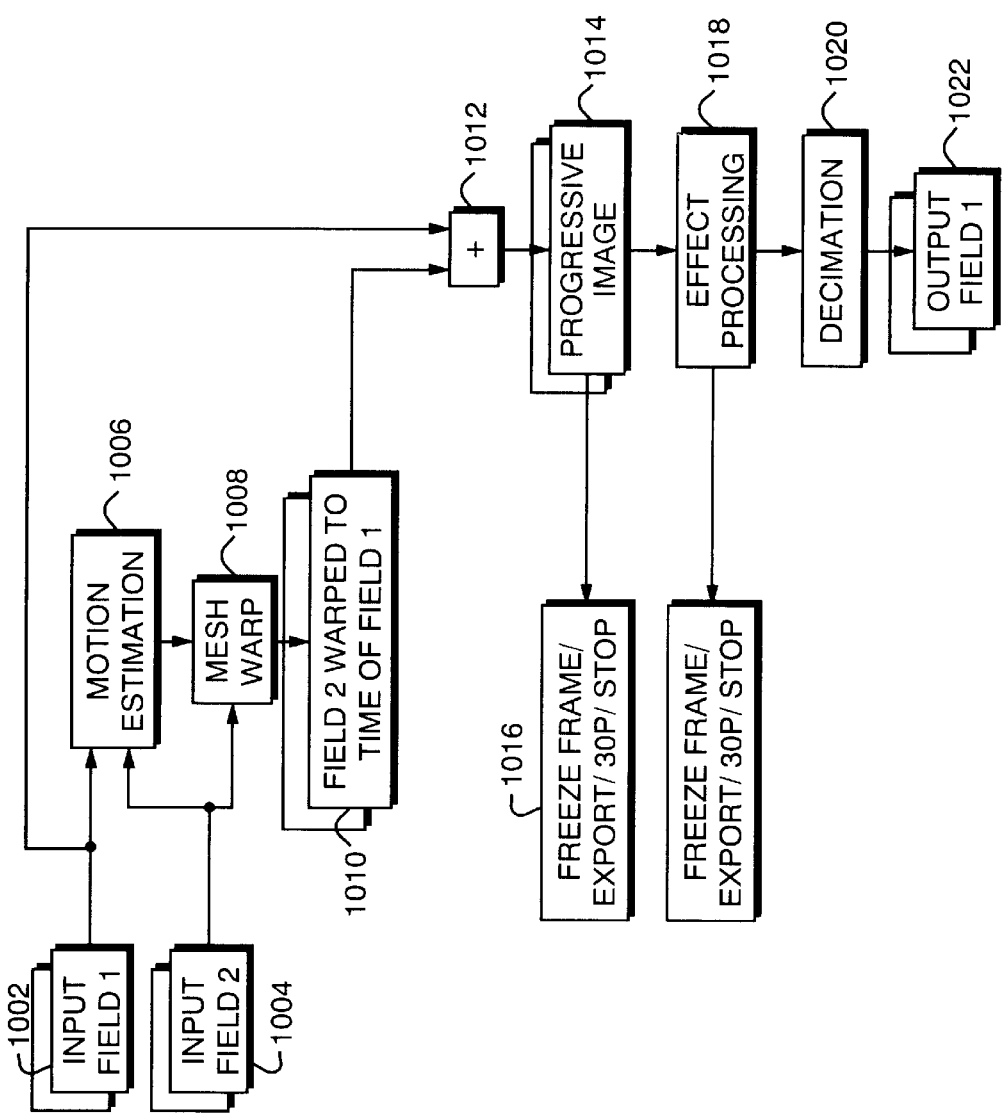
FIG. 10 illustrates an example of generation of and effects processing on progressive images from interlaced images.

By processing the interlaced images in this manner, progressive images may be generated from interlaced images. Such progressive images may be used to improve effects processing. For example, as shown in FIG. 10, two input fields 1002 and 1004 are processed using optical flow motion estimation 1006 to produce a motion vector map. The second input field 1004 is the warped using mesh warp engine 1008 to the time of field 1, as indicated at 1010. A field prior to the first field also may be warped to the time of the first field and may be blended with the warped second field to produce a field at the time of the first field. The warped second field and the first field are combined, as indicated at 1012, to produce a progressive scan image 1014. This progressive scan image could be used, for example, as a freeze frame image, an export image or as part of a sequence of progressive images, as indicated at 1016. An effects processing module 1018 also may use this progressive image to perform various effects, such as a resizing operation. The results of the effects processing on the progressive image can be vertically decimated as indicated at 1020 (by taking only the odd lines or only the even lines) to generate an output field 1022.

Several modifications may be made to handle problems that arise around the edges of the image. To reduce such problems, if the motion vectors map an output pixel to a point that lies outside of one of the original input images, no contribution is taken from the input image. Normally, both input images contribute to the output image. If a warped triangle covers pixels in only one of the two input images, only that input image contributes to the output image. If neither input image is covered by one of the transformed triangles, neither input image contributes to the output pixels covered by that particular triangle.

To handle the case where certain output pixels have no contribution from the input images using the warping operation described above, before this operation is performed the two input images may be blended to produce an output image using a standard alpha-blend function: R=(1−d)*A+ d*B. When the warp operation is performed, if the input images do not contribute anything to an output pixel, the output pixel still has a valid value.

Images that are captured from analog source video also may have pixels around the border of the image that are not part of the desired captured image. Often these pixels are black, including a black line at the top and bottom, and values ramping up from black along the left and right edges. These edges may be handled specially so that they do not contribute adversely to the motion vectors that are computed. The black lines at the top and bottom of the image may be overwritten by the second line and the next to last line, respectively, before the motion vectors are computed. Likewise, the pixels at the left edge of each line may be overwritten by the first valid (i.e., non-black) image pixel in each line, and the pixels at the right edge of each line may be overwritten by the last valid image pixel in each line. When generating the output image, the left and right edge output pixels are taken from the original image, with all other pixels being produced by the warping operation.

Occasionally, there are regions in an image in which motion of pixels cannot be estimated correctly by computing optical flow. These regions may be identified by the occurrence of a high level of error that remains when the two input images are warped toward each other, to the same point in time. This error can be estimated by subtracting the first warped image from the second warped image, to produce a difference image. In this difference image, areas containing large non-zero values may be aggregate into regions, for example by using a threshold operation. A morphological hole fill operator may be used to unify small groups of error pixels into contiguous regions.

Non-zero areas in the difference image correspond to areas where the motion vectors do not correctly predict the motion and/or areas in which the constant brightness constraint, the assumption behind the computation of optical flow, is violated. One such violation commonly occurs when objects enter or leave the scene, or are revealed or occluded. When such a violation of the constant brightness constraint occurs, the motion vectors from one coherent area of motion bleed into another coherent area of motion. When these motion vectors are used to warp the input images to produce an output image, the output image has visible artifacts.

Figure 4A:
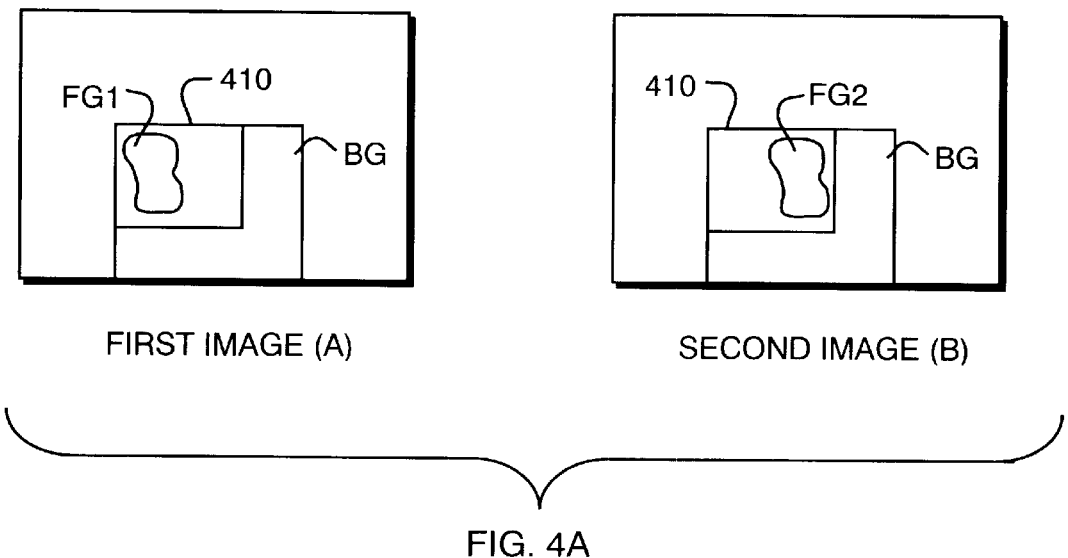
FIGS. 4A–B illustrate segmentation of an image region for modifying the set of motion vectors and creating a combination map.

Referring now to FIG. 4A, to account for violations of the constant brightness constraint, a region of an image that contains an artifact is segmented. The image region is segmented into two coherently moving areas: a foreground region (FG1 and FG2) and a background region (BG). This segmentation is performed on each input image of each pair of input images for which the output image exhibits a visible artifact. Identification of a region and this segmentation may be performed automatically, for example using a luma key or a chroma key, or may use a predetermined matte, or may be performed by a user through an appropriate graphical user interface, such as a tracing tool that is used by the user to trace a foreground object. A new set of motion vectors is generated using the defined segmentation. A "combination map" also may be generated, as described below in connection with FIG. 4B in one embodiment, to control how the input images are combined using the new set of motion vectors.

The following description provides three approaches for fixing the set of motion vectors. The particular approach used to remove an artifact may be selected by providing a mechanism through a user interface through which the user may indicate the kind of artifact that is present in the image.

Figure 4B:
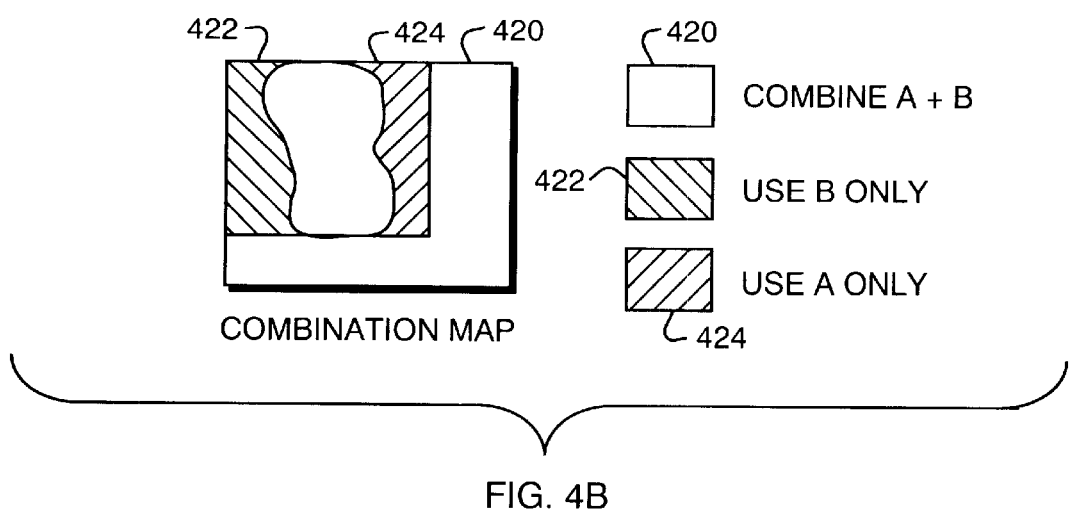
Figure 5A:
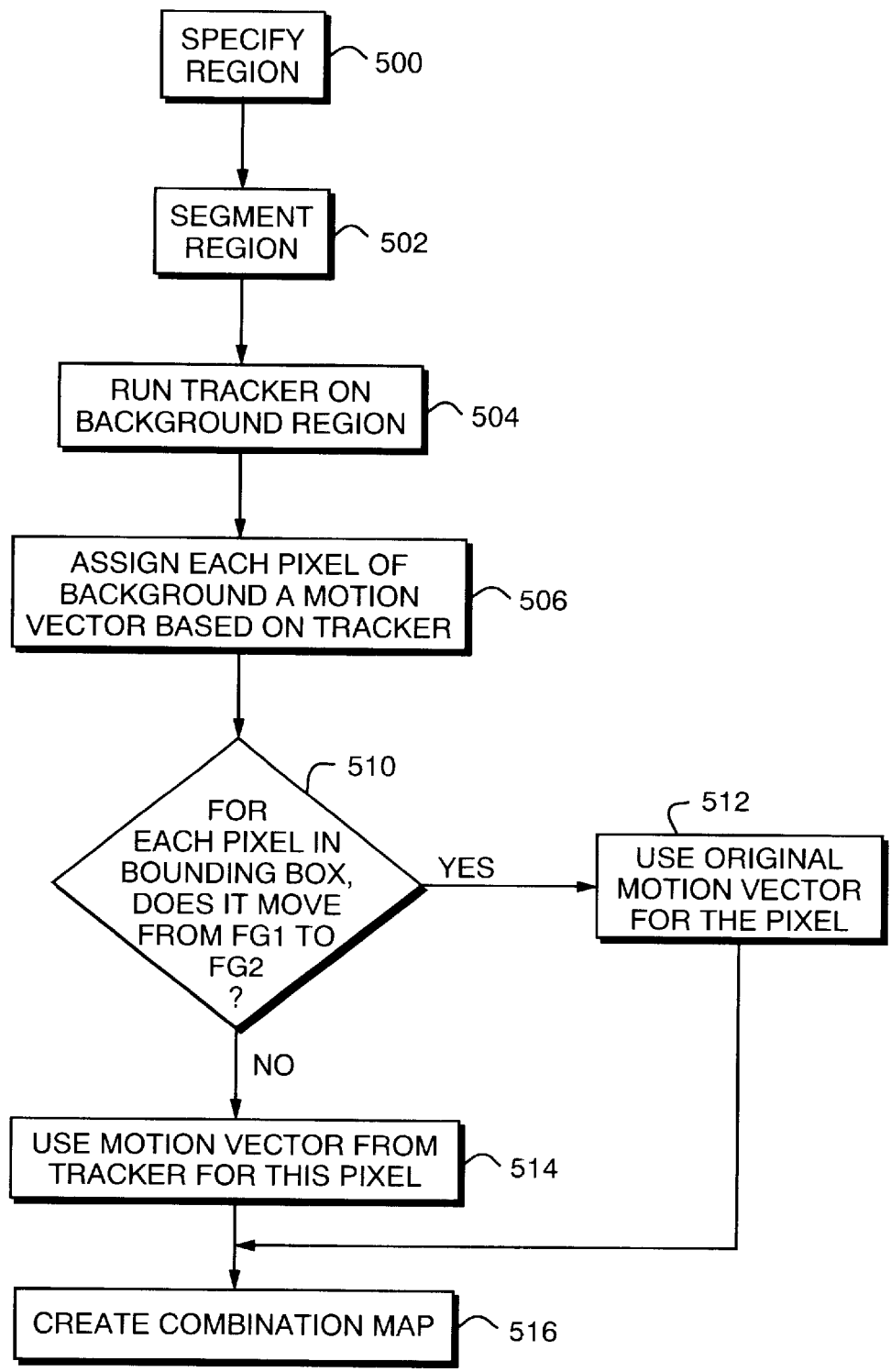
FIG. 5A is a flowchart describing an approach for correcting a first kind of artifact.

The first approach, as shown in the flow chart of FIG. 5A, is used when the background segment shows artifacts, but the foreground segment does not. In this case, the original motion vectors may be used to describe the foreground motion, but not the background motion. After specification of an image region (step 500) and segmentation of the image region (step 502), a motion vector for each pixel in the background area is determined by running a region tracker on the specified background area (step 504). Any suitable region tracker, such as those used for stabilization and object tracking applications may be used. This background area is exclusive of a region (410 in FIG. 4) that includes both of the foreground regions FG1 and FG2 of the first and second images. The result of the region tracker is a single motion vector describing the motion of the background area. Each pixel in the entire background region, excluding region 410, is then assigned this single motion vector, or the parameterized motion model of the tracker (step 506). Next, for each pixel in the bounding box 410, it is then determined whether the original motion vector for the pixel, or the new motion vector for the background is to be used. As shown in FIG. 4A, for each pixel in the bounding box 410 that incorporates foreground FG1 and foreground FG2, if an original motion vector would move the pixel from the foreground region FG1 in the first image to the foreground region FG2 in the second image (step 510) then the original motion vector is used (step 512). Otherwise, the newly determined motion vector for the background is assigned to that pixel (step 514).

Given the modified set of motion vectors, a "combination map," such as shown in FIG. 4B, may be created (step 516). The combination map may be used to control how pixels from the background and foreground are combined using the new set of motion vectors. In particular, if a pixel in the bounding box 410 (FIG. 4A), and outside of the foreground FG1 of the first input image is transformed by a motion vector to the foreground region FG2 of the second input image, then only the first input image is used to generate the output image using this motion vector. Similarly, if a pixel in the foreground region FG1 (FIG. 4A) of the first input image is transformed by a motion vector to the region outside of the foreground FG2 of the second input image, then only the second input image is used to generate the output image using this motion vector. Thus, each motion vector may be assigned a value, for example by creating a new two-dimensional image, called a "combination map," which has values of 0, 1, or 2. A value of 0 indicates to combine both frames A and B, as indicated at 420. A value of 1 indicates that only frame A contributes to the output when warping, as indicated at 424, and a value of 2 indicates that only frame B contributes to the output, as indicated at 422. The combination map may be processed, for example by a filter, to fill any holes or to account for incorrectly segmented input regions.

Figure 5B:
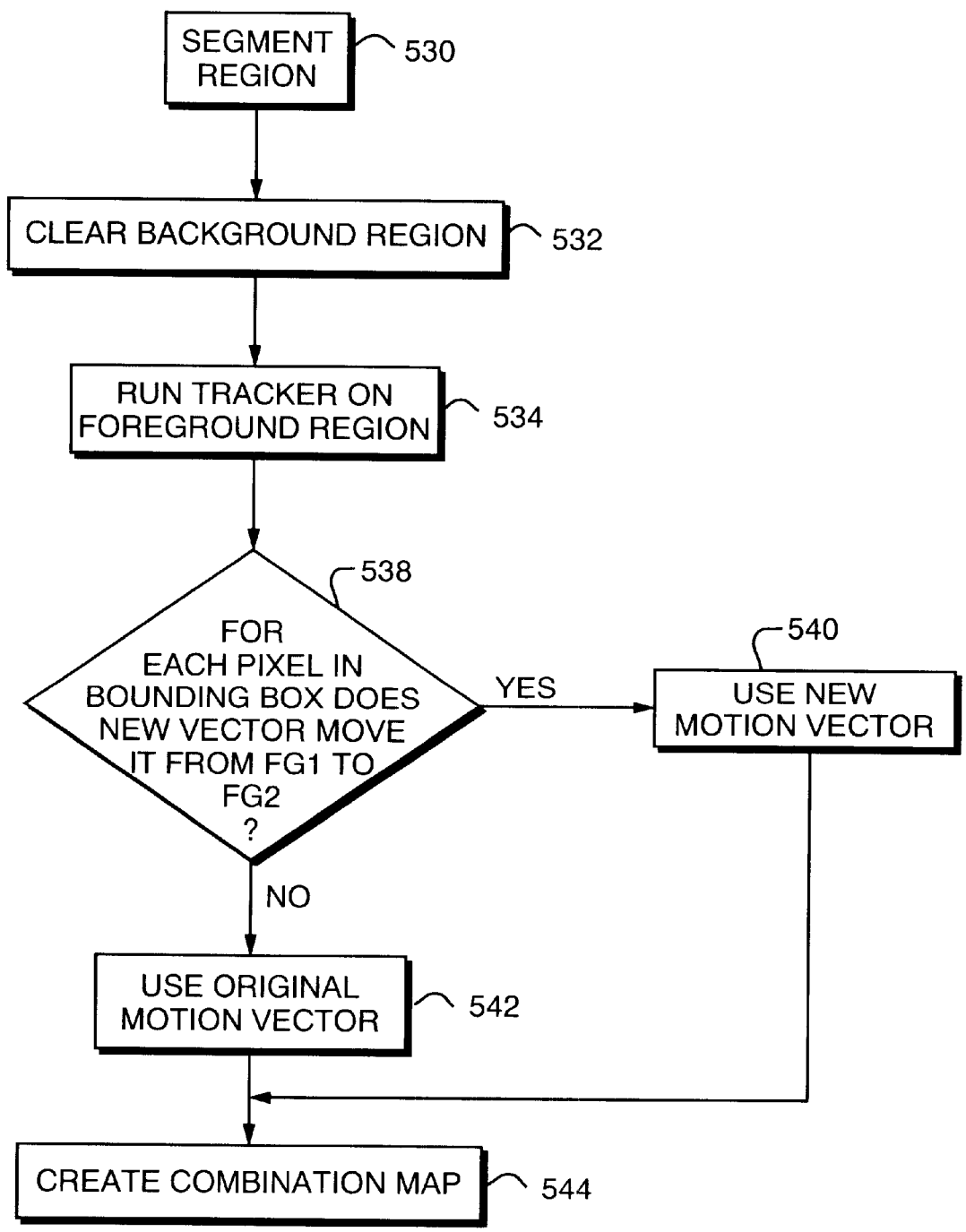
FIG. 5B is a flowchart describing an approach for correcting a second kind of artifact.

In a second approach, shown in FIG. 5B, the foreground segment exhibits artifacts, but the background segment does not. In this case, the original motion vectors may be used to describe the background motion, but not the foreground motion. Thus, after segmenting an area into foreground and background regions (step 530), the background image region is cleared (step 532). A tracker is run on the foreground region (step 534) and to obtain a single motion vector or parameterized motion model. Next, for each pixel in the bounding box 410, it is determined whether the new motion estimate transforms a pixel in the foreground FG1 of the first image to a pixel in the foreground FG2 of the second image (step 538). If it does, then the new motion vector obtained from the result of the tracker is used (step 540). If not, then the original motion vector is used (step 542). A combination map then may be created (step 544) to decide from which input images pixels are taken in the warping operation.

Figure 5C:
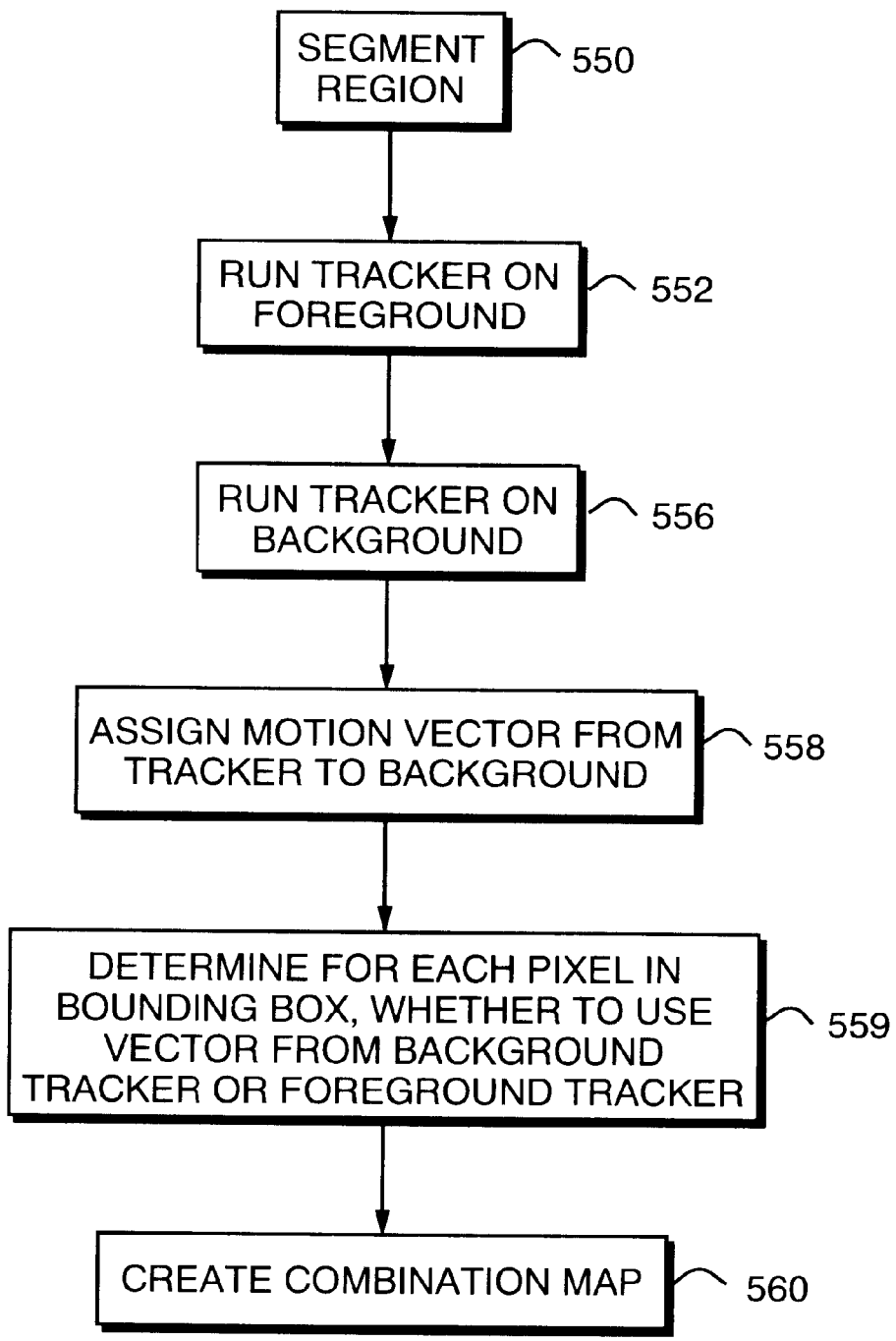
FIG. 5C is a flowchart describing an approach for correcting a third kind of artifact.

In a third approach, as shown in the flow chart of FIG. 5C, both the foreground and background regions exhibit artifacts. After segmentation of the region (step 550), a region tracker is run on the foreground region (step 552). A region tracker is run on the background region (step 556). All pixels in the background BG are assigned this single motion vector resulting from the tracker (step 558). Pixels in the bounding box 410 are assigned a motion vector from the foreground tracker or from the background tracker according to whether the motion vector from the foreground tracker transforms the pixel from foreground FG1 to foreground FG2 (step 559). A combination map then may be created (step 560).

A user interface also may be provided to allow a user to correct one or more individual motion vectors. The results of changes to the motion vectors may be shown interactively by updating the output image generated by warping and blending the two input images using the updated motion vectors. Another aid in visualizing the result is to show a difference image between warped image 1 and warped image 2. Further, a number of options may be presented to the user to change the set of motion vectors. For instance, a user may be permitted to define a region of vectors. The user may provide a single value for the whole region, or a separate value for each of several individual pixels in the region. Alternatively, a single value could be assigned automatically to the region, for example by computing an average value of a different region of vectors, or other values may be assigned automatically.

A region tracker that may be used in any of the approaches described above may produce a single motion vector, which describes translational motion, or may produce an affine motion model defined by six parameters, or may produce a projective motion model defined by eight parameters. The output of these motion models is used to generate a new set of per pixel motion vectors.

A general-purpose computer system may be used to implement an embodiment of the invention. Such a computer system typically includes a processor, an input device, a display device, and a memory. The memory stores interpolation software for generating one or more intermediate images between two selected images according to the present invention. The computer display device displays a software generated user interface to accommodate the functionality of the interpolation system.

The computer system may be an IBM compatible personal computer system which is available from a number of computer system manufacturers as is well known by those of ordinary skill in the art. In another embodiment, the computer system may be a Macintosh computer, available from Apple Computer, Inc. of Cupertino, Calif., a SPARCstation workstation, available from Sun Microsystems of Mountain View, Calif., and a workstation, available from Silicon Graphics, Inc. of Mountain View, Calif. In a further embodiment of the invention, computer system executes an operating system such as Windows NT by Microsoft Corporation of Redmond, Wash., Solaris by Sun Microsystems, Inc., IRIS by Silicon Graphics, Inc. or versions of Linux, or Unix. Those of ordinary skill in the art will clearly recognize that other computer systems and operating systems are acceptable for practicing the invention, and the invention is not limited to any particular computer system or operating system. The computer system need only have some type of processor for executing instructions and manipulating data. The memory stores data and instructions. The memory may include both a volatile memory such as RAM and non-volatile memory such as a ROM, a magnetic disk, an optical disk, a CD-ROM or the like. The input device allows the user to interact with the interpolation software. The input device may include, for example, one or more of a keyboard, a mouse, or a trackball. The display device displays a user interface for the interpolation software. The display device may include, for example, a cathode ray tube (CRT), a flat panel display, or some other display device. The interpolation software includes data and computer instructions for generating one or more intermediate images between two selected images according to the present invention.

Figure 6:
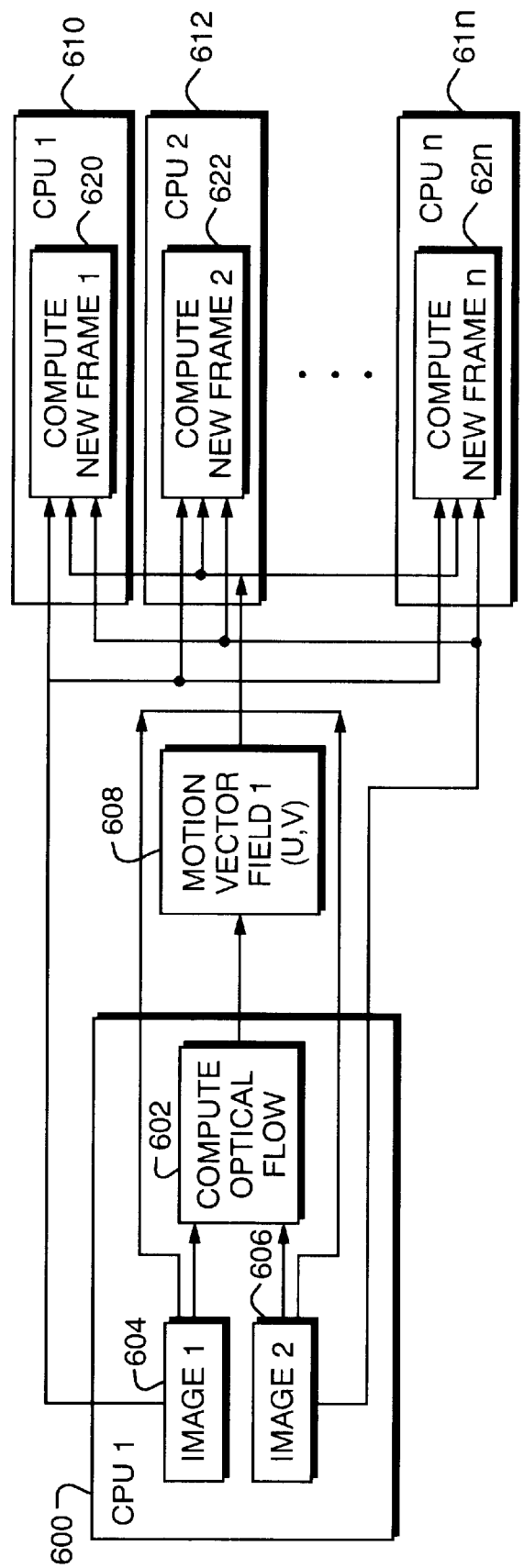
FIG. 6 block diagram of an implementation for generating a set of images in a distributed manner.

In one embodiment, the generation of the output images may be performed in a distributed manner using many processors, as shown in FIG. 6. In particular, a first processor (CPU1) 600 may be used to compute, as indicated at 602, the optical flow from the first image 604 and second image 606 to obtain the motion vectors 608. Because the motion vectors may be used to generate all intermediate images, each intermediate image 1, 2, . . . , n, can be computed using its own processor 610, 612 . . . , 61N, (CPU1, CPU2 . . . CPUN) with each processor executing its own warping software 620, 622, 62N. Thus, each pair of images for which motion vectors are computed may be handled independently, possibly with parallel or pipelined instantiations of the system shown in FIG. 6. Thus retiming of a video sequence may be broken down into operations on pairs of images. Motion vectors for each pair of images may be calculated once, and may be cached.

There are several applications of these techniques to image processing, including, but not limited to the following.

Retiming can be used to produce slow motion sequences or to alter frame rate. New fields or frames can be produced at any point in time between existing frames. Applications include converting 24 frame per second image sequences to 50 or 60 interlaced fields per second, converting old slow frame rate movies to current frame rates (8 fps to 24 fps, for example), smooth slow motion effects, including super slow motion, and acceleration and deceleration of motion using a curve to specify the rate of motion.

Figure 7:
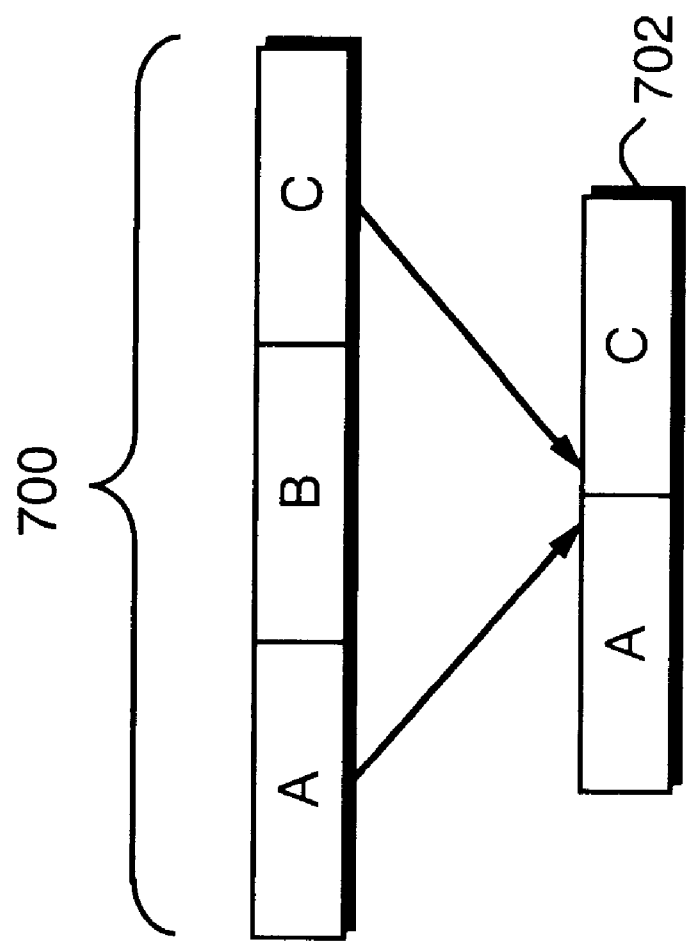
FIG. 7 illustrates an example of a jump cut.

The same operations used in retiming can be used to hide jump cuts. A jump cut occurs when two pieces of material of similar content but shot at slightly different times are adjoined in sequence in a video composition, such as shown in FIG. 7. For example, an interview may be recorded as a single sequence of images 700. A segment B might be removed during editing, so that the sequence resulting from editing (shown at 702) includes a cut from the first segment A to the last segment C. When the edited sequence is played back without any processing at the cut from segment A to segment C, the discontinuity at the cut point may be noticeable and disturbing. Commonly, the cut is hidden by a dissolve transition or a wipe. This cut can be hidden by morphing between one or more of the last few images of the first segment A and one or more of the first few images of the subsequent segment C.

There is a "most natural" cadence to a speaker's dialogue, and speakers regularly pause for emphasis or dramatic effect, to think, or for a breath between statements. When two separate audio clips of speech are joined together to form a new clip, such as at a jump cut, it may be desirable to introduce a pause between the clips in order to properly pace the speech. Also, with the same audio clip, it may be desirable to extend a pause to change the cadence of the speech. By making changes to the audio, the corresponding video also is modified to maintain synchronization between the audio and video. The additional frames used to extend the video portion of the work may be generated using the operations described above instead of merely adding redundant frames. Additional video frames may be generated to morph the corresponding video to accommodate an extended pause in the audio, as will be described in connection with FIGS. 8A–B. Replacement video frames also may be generated to morph the corresponding video to hide the jump cut instead of using a dissolve or wipe transition at the jump cut, such as described in connection with FIG. 9.

Figure 8A:
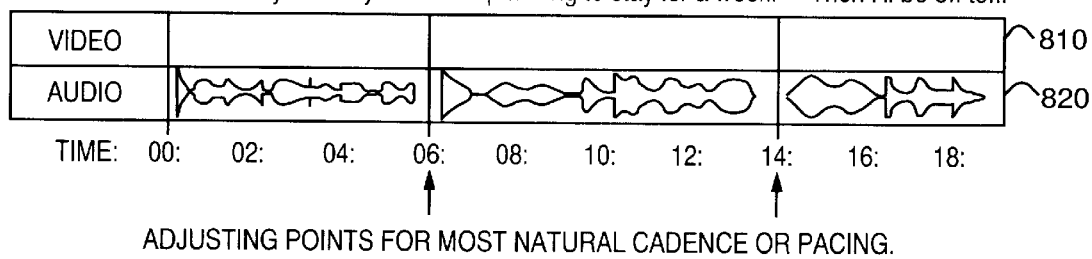
FIGS. 8A–8C illustrate an example of processing of a jump cut to add images to a sequence around a jump cut.
Figure 8B:
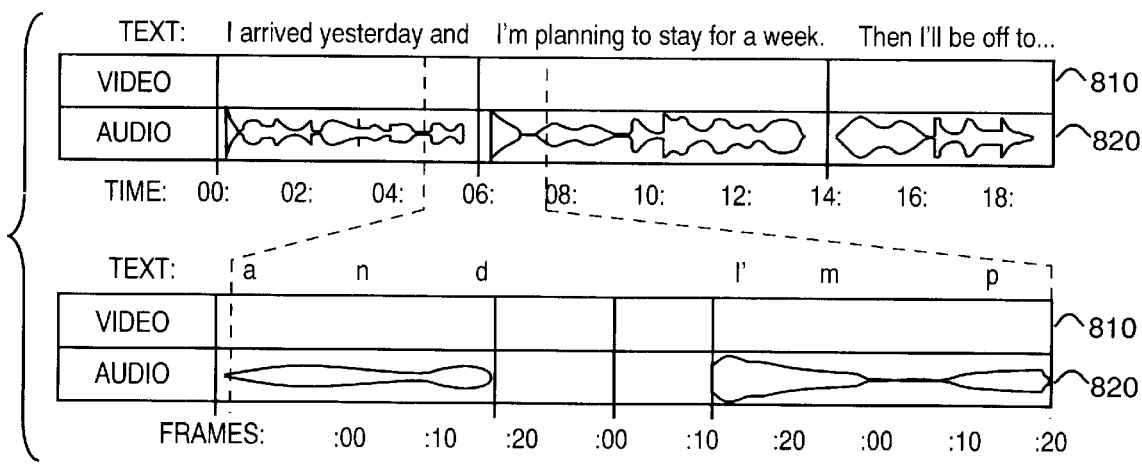
Figure 9:
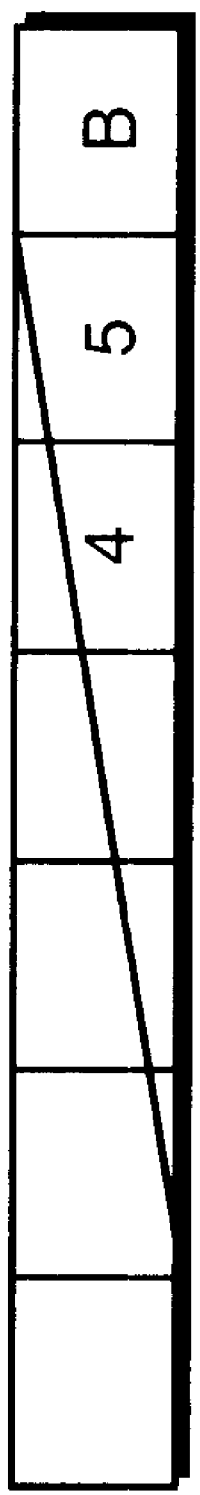
FIG. 9 illustrates an example of processing a transition.

Referring to FIGS. 8A–B, there is shown a video timeline 810 and its corresponding audio timeline 820. The audio timeline 820 displays the recorded sound wave as time progresses. In FIG. 8A, the audio timeline displays a sound wave corresponding to a speaker uttering the words "I arrived yesterday and I'm planning to stay for a week. Then I'll be off to . . . " For audio timeline 820, time is measured in seconds, and it is clear that at 6 seconds into the audio clip, the speaker has taken a pause before continuing on with speech. If an editor desires to slow the cadence of the speech by extending the pause between the speech, the video must also be extended or the audio video portions of the work will lose synchronization. After the new cadence is established, additional images are generated to visually blend the abutting video clips at the edit point.

Figure 8C:
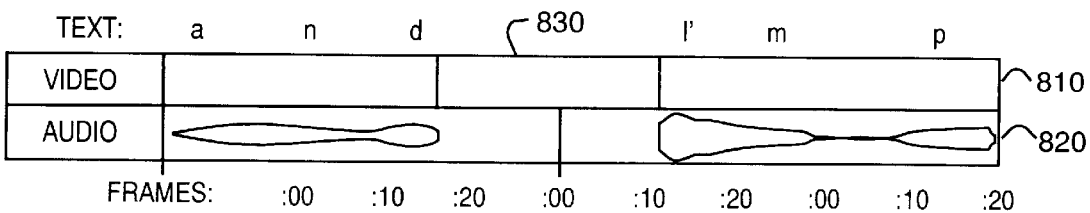

Referring to FIG. 8B, the video timeline 810 and audio timeline 820 are edited to generate an extended pause between the spoken words "and" and "I'm". The editor trims the abutting video clips surrounding the newly generated pause. The operations described above are used to generate additional images 830 corresponding to the duration of the pause, as shown in FIG. 8C.

Speech pauses in the audio track are easily detectable and can serve as a way to automatically identify the boundary points for the additional images. In particular, the first instances of audio above a selected threshold that immediately precede and follow an edit point may be identified as the boundary points for the additional images. In this manner the start and end images for blending the video during the pause are easily identified.

Optical flow based morphing also can be used to generate a transition at a jump cut or even between two dissimilar pieces of video. In this case the operations described above are applied between pairs of images selected from the incoming and outgoing video. Referring to the FIG. 9, this effect determines the motion vectors between images A1 and B5, and warps and blends the corresponding images. Next the motion vectors between images A2 and B5 are determined, and the corresponding images are warped and blended. The same process continues for each pair of images until the motion vectors for images A5 and B5 are determined and used to warp and blend the corresponding images. The factor that is used to scale the motion vectors and to blend the warped images for each pair of images is proportional to the number of frames into the effect at which the output image is produced. The result is that for the first output image, image A1 is only slightly warped toward image B5, and image B5 is heavily warped toward image A1, but the warped image A1 contributes to the output image more than the warped image B5. At the last output image, input image A5 is heavily warped toward image B5, and image B5 is only slightly warped toward image A5, but the warped image B5 contributes to the output image more than the warped image A5. For interlaced video, only the first field of image B5 is used. The fields of the input image sequence are scaled up to full frame size and warped to a scaled up field of image B5 to compute the appropriate output field.

Motion vectors also may be used to selectively blur an image in the direction of motion to add motion blur. Conversely, the motion-based warp may be used to align multiple frames to remove motion blur.

Visual defects such as film scratches and video dropouts may also be identified using frame differencing or a gray scale morphological filter. An area that contains a defect may be filled using motion based warping. Because the motion vectors generally cannot be calculated directly in the area of the defect, they can be estimated using the two frames on either side of the one with the defect. Vectors also may be computed for the region near, but outside, the defect and propagated via smoothing to the interior of the defective region.

Motion compensated interpolation also may be used to change the duration of a sequence of images and its associated audio. Such an operation may be provided for selection by an operator of the interpolation software in a manner that selection of the operation automatically adjusts the duration of both the sequence of images and audio, without having to separately process the audio. The operator also may input an indication of a desired duration of the sequence of images. In this application, for each pair of images, a motion vector is computed for each pixel that describes motion of the pixel between the two images. Motion compensated interpolation is performed to generate one or more images between the two images according to the determined motion vectors. Such interpolation may be performed for multiple pairs of images to create the output sequence of images. The duration of the associated audio then is adjusted to retain synchronization with the output sequence of images. The adjustment of the duration may be performed using resampling, which changes the pitch of the audio. The adjustment of the duration may be performed using time scaling, which does not change the pitch of the audio. The operation is useful in various applications such as, when the sequence of images is processed to be a slow motion sequence, or when the sequence of images is processed to fit a predetermined amount of time allotted for it in a production.

Optical flow also can be used to create a mapping from one two dimensional data set to another. As long as it is reasonable to assume that there is a conservation of a quantity that is analogous to luminance in the two data sets, then the results will be meaningful. That is, analyzing motion within the two data sets using optical flow will indicate how data points in the one data set move to points in the other data set. One such application is the automatic generation of secondary color correction maps by applying optical flow to two two-dimensional color histograms. For example, there may be two related sequences (e.g., two different camera angles of the same scene) for which color correction may be performed. One or more images for each sequence may be used to generate a color histogram for each sequence. A color histogram of an image indicates the number of pixels in the image for each color, such as each pair of Cr,Cb values. The histogram count values are analogous to luminance values in this application and are assumed to be conserved between the two histograms. The color histograms may be filtered, for example using a median filter, or a Guassian or other blurring filter before being analyzed for motion. Motion of data between the two histogram data sets indicates a change of color of objects in the scene. A set of motion vectors then is calculated to describe the motion between the histogram of the first sequence and the histogram of the second sequence. Thus, the motion vectors so determined indicate, for each pair of Cr, Cb values, another Cr, Cb value to which it maps. This mapping may be used to load a map for secondary color correction to allow one or more images in one of the sequences, or in another sequence, to have colors corrected to match one or more images in the other sequence.

Having now described a few embodiments, it should be apparent to those skilled in the art that the foregoing is merely illustrative and not limiting, having been presented by way of example only. For example, the output image need not be spaced temporally between the two images from which it is created. Numerous modifications and other embodiments are within in the scope of one of ordinary skill in the art and are contemplated as falling within with scope of the invention.

What is claimed is:

1. A method for processing two fields of interlaced video, comprising:

computing motion vectors describing motion of image characteristics from a field to another field of opposite sense;

removing from the motion vectors an offset corresponding to one half of a line and having a sign according to an orientation of the y-axis of the image space and which field includes the top line;

using the motion vectors to generate a sampling region at a desired output time;

transforming the sampling region using the motion vectors to a sample time at one of the fields;

transforming the sampling region using the motion vectors to a sample time at the other of the fields;

determining a field sense of an output field to be generated at the desired output time;

translating the transformed sampling region for the field with a field sense opposite the field sense of the output field by an offset of one half of a line and having a sign determined by an orientation of the y-axis of the image space and which field includes the top line; and generating the output field using the transformed and translated sampling regions and the input fields.

2. The method of claim 1, further comprising:

wherein the desired output time is the time of one of the fields;

combining the generated output field with the field at the desired output time to generate a progressive image.

3. The method of claim 2, further comprising:

performing an effect on the progressive image.

4. The method of claim 3, further comprising:

vertically decimating the progressive image with the effect to produce a field at the desired output time.

5. A method for processing two fields of interlaced video, comprising:

computing motion vectors describing motion of image characteristics from a field to another field of opposite sense;

removing from the motion vectors an offset corresponding to one half of a line and having a sign according to an orientation of the y-axis of the image space and which field includes the top line;

selecting a time of one of the fields as a desired output time;

transforming a sampling region specified at the selected time using the motion vectors to a sample time at the field that is being warped;

translating the transformed sampling region by an offset of one half of a line and having a sign determined by an orientation of the y-axis of the image space and which field includes the top line; and generating the output field at the desired output time using the transformed and translated sampling region and the field that is being warped.

6. The method of claim 5, further comprising:

combining the generated output field with the field at the desired output time to generate a progressive image.

7. The method of claim 6, further comprising:

performing an effect on the progressive image.

8. The method of claim 7, further comprising:

vertically decimating the progressive image with the effect to produce a field at the desired output time.

9. The method of claim 6, further comprising:

exporting the progressive image to a file.

10. The method of claim 6, further comprising:

displaying the progressive image as a still frame.

11. The method of claim 10, wherein displaying the progressive image as a still frame includes displaying the progressive image in a freeze frame effect.

12. The method of claim 10, wherein displaying the progressive image as a still frame includes displaying the progressive image upon stopping playback.

13. The method of claim 5, further comprising:

warping another field of the opposite sense to the desired output time; and blending the two warped fields to produce a field at the desired output time.

* * * * *